US007686455B2

(12) United States Patent
Yoshimura et al.

(10) Patent No.: US 7,686,455 B2
(45) Date of Patent: Mar. 30, 2010

(54) OPTICAL SYSTEM AND PROJECTION DISPLAY DEVICE

(75) Inventors: Makoto Yoshimura, Yokohama (JP); Masato Furuya, Yokohama (JP); Masaru Kanazawa, Tokyo (JP); Yuichi Kusakabe, Tokyo (JP)

(73) Assignees: Victor Company of Japan, Limited, Yokohama-shi (JP); Nippon Hoso Kyokai, Tokyo (JP)

( * ) Notice: Subject to any disclaimer, the term of this patent is extended or adjusted under 35 U.S.C. 154(b) by 0 days.

(21) Appl. No.: 12/289,942

(22) Filed: Nov. 7, 2008

(65) Prior Publication Data
US 2009/0116085 A1 May 7, 2009

(30) Foreign Application Priority Data
Nov. 7, 2007 (JP) ............................ 2007-289901

(51) Int. Cl.
*G03B 21/28* (2006.01)
*G09G 5/02* (2006.01)
*G06T 15/00* (2006.01)
*G09G 1/28* (2006.01)
(52) U.S. Cl. ............................... 353/31; 353/7; 353/81; 345/604; 345/619; 345/419; 345/22
(58) Field of Classification Search .................... 353/31, 353/7, 81, 69; 345/604, 619, 590, 591, 419, 345/22
See application file for complete search history.

(56) References Cited
U.S. PATENT DOCUMENTS
6,538,742 B1 * 3/2003 Ohsawa ...................... 356/405

(Continued)

FOREIGN PATENT DOCUMENTS
JP 2000-253263 A 9/2000

(Continued)

OTHER PUBLICATIONS
Yamaguchi, Masahiro et al., "High-fidelity video and still-image communication based on spectral information: Natural Vision system and its applications," Spectral Imaging: Eighth International Symposium on Multispectral Color Science, 2006, vol. 6062.

(Continued)

*Primary Examiner*—Georgia Y Epps
*Assistant Examiner*—Magda Cruz
(74) *Attorney, Agent, or Firm*—The Nath Law Group; Jerald L. Meyer; Jiaxiao Zhang

(57) ABSTRACT

Light in primary colors RGB modulated in a first modulation optical system is transmitted through a relay lens (36) and further divided into a P-polarized light and an S-polarized light by a PS separation wire grid (37). The S-polarized light is transmitted through a wavelength spectral filter (39) to select red/green/blue light components R1, G1, B1 of 615, 515, 450 nm in wavelength, which are then modulated by a Y1 device (44). The P-polarized light is transmitted through a wavelength spectral filter (46) to select red/green/blue light components R2, G2, B2 of 650, 550, 475 nm in wavelength, which are then modulated by a Y2 device (51). The 3-primary color lights modulated by the Y1/Y2 devices (44), (51) are combined with each other at a PS composite wire grid (55) to project a synthetic light on a screen.

4 Claims, 12 Drawing Sheets

U.S. PATENT DOCUMENTS 6,633,302 B1 * 10/2003 Ohsawa et al. .............. 345/604
7,339,596 B2 * 3/2008 Tajima ....................... 345/600

FOREIGN PATENT DOCUMENTS

JP        2000-338950 A    12/2000

OTHER PUBLICATIONS

"Wavelength Division System—3D principle (9) stereofilter," Internet, http://www2.aimnet.ne.jp/nakahara/3dart/3genri9.html, downloaded Jun. 27, 2008.

* cited by examiner

WAVEFORMS OF WAVELENGTH SPECTRAL FILTER

OPTICAL SYSTEM AND PROJECTION DISPLAY DEVICE

BACKGROUND OF THE INVENTION

1. Field of the Invention

The present invention relates to an optical system and a projection display device. Particularly, the present invention relates to an optical system and a projection display device both of which can provide high-contrast images and multi-primary color/3-dimensional images for a projection type projector.

2. Description of Related Art

Conventionally, a 3-panel type projector using three pieces (red, green, blue) of modulation devices is general in the projection display device (projector). Depending on the kind of devices, the 3-panel type projectors comprise LCD (Liquid Crystal Display) projector, DLP (Digital Light Processing) projector, LCOS (Liquid Crystal on Silicon) projector and so on. However, there is a possibility that precise color reproduction couldn't be attained by only a single 3-panel type projector since its reproducible area is limited to an area represented as the sum of 3-dimensional color vectors in a 3-dimensional color space.

Therefore, there are proposed multi-primary color projectors each using four or more colors in order to attain more accurate color reproduction (e.g. Japanese Patent Laid-Open Publication Nos. 2000-253263 and 2000-338950). In common with these projection display devices, there are adopted two projectors: one for inputting two data about primary colors C1 and C2 where emission spectrums are distributed in the wavelength bands of different visible ranges and the other for inputting two data about primary colors C3 and C4 where emission spectrums are distributed in the wavelength bands of different visible ranges, which are also different from the wavelength bands of C1, C2. Then, these projectors project respective lights corresponding to the primary colors' data on a screen, realizing a color reproduction range of 4-primary colors broader than the color reproduction range of 3-primary colors.

Meanwhile, there is also known a multi-primary color (6-primary color) projection display device having a boarder color reproduction range than that of the above projector adopting 4-primary colors (e.g. Masahiro Yamaguchi et al., "High-fidelity video and still-image communication based on spectral information: Natural Vision System and its applications", http://www.isl.titech.ac.jp/guchi/NV/EI06-6062-16c.pdf, Searching Date: Oct. 5, 2007). FIG. 1 is a structural view showing an example of this multi-primary color (6-primary color) projection display device. The shown multi-primary color projection display device comprises a 6-primary color signal processing and converting block 1 and two DLP projectors 8A, 8B thereby to project an image on a screen 9.

The 6-primary color signal processing and converting block 1 has two signal transmission routes for the DLP projectors 8A, 8B. In accordance with one route, dual-linked SDI signals from a decoder 2 are once stored in an output memory unit 3 and directly supplied to the DLP projectors 8A, 8B as they are in the form of TMDS (Transition Minimized Differential Signaling). In accordance with another route, the dual-linked SDI signals stored in the output memory unit 3 are once formatted by a format converter 4 and successively converted to 6-primary colors by a 3-6 color conversion unit 5. Then, the so-converted SDI signals are supplied to the DLP projectors 8A, 8B. Note, the output memory unit 3 and the 3-6 color conversion unit 5 are together controlled in operation by a multi-primary color conversion workstation unit 6 and a 3-primary color conversion workstation unit 7, allowing the SDI signals to be converted to 3-primary colors up to 6-primary colors.

Besides the DLP projectors 8A, 8B, the above-mentioned projection display may adopt another projector, for example, a LCOS projector shown in FIG. 2. In FIG. 2, white light is emitted from a specified lamp (e.g. xenon lamp, ultra-high pressure mercury lamp, laser diode, light emission diode, etc.) in a lamp house 11. Then, the white light is changed to a parallel light by a condenser lens 12 and successively reflected by a cold mirror 13 for eliminating UV light or IR light unnecessary for a display device or interposed optical components. Then, the so-reflected light is transmitted through an integrator (rod integrator, flyeye integrator, etc.) 14 and a sequent field lens 15 thereby to enter a B/RG dichroic mirror 16.

The B/RG dichroic mirror 16 resolves incident illumination light to a light containing the wave bands of both red light and green light and a blue light, so that the former light (red and green) enters a RG mirror 17, while the latter light (blue) enters a B mirror 18. In the former light reflected by the RG mirror 17, its red light component is transmitted through a R/G dichroic mirror 19 thereby to enter an R field lens 24, while the green light component is reflected by the R/G dichroic mirror 19 thereby to enter a G field lens 20.

Regarding the green light component transmitted through the G field lens 20 and the red light component transmitted through R field lens 24, their S-polarization components are reflected by wire grids 21, 25 as polarization split elements thereby to enter a G device 23 and an R device 27 through a G quarter-wave ($\lambda/4$) plate 22 and an R quarter-wave ($\lambda/4$) plate 26, respectively. After light modulation at the G device 23 and the R device 27 with green signal and red signal of an image to be displayed from the 6-primary color signal processing and converting block 1, their P-polarized lights on light modulation are transmitted through the G, R quarter-wave ($\lambda/4$) plates 22, 26 and the wire grids 21, 25 thereby to enter an RGB composite dichroic prism 32.

On the other hand, regarding the blue light component reflected by the B mirror 18, it is transmitted through a B field lens 28 and the light's S-polarization component is reflected by a wire grid 29 thereby to enter a B device 31 through a B quarter-wave ($\lambda/4$) plate 30. After light modulation at the B device 31 with blue signal of the image to be displayed from the 6-primary color signal processing and converting block 1, the S-polarized light on light modulation is transmitted through the B quarter-wave ($\lambda/4$) plate 30 and the wire grid 29 thereby to enter the RGB composite dichroic prism 32.

The RGB composite dichroic prism 32 recombines respective P-polarization components of incident green, red and blue lights on light modulation. The so-combined light is transmitted through a PJ lens 33 to form an image on a screen.

Depending on the characteristics of the RG mirror 17, the B mirror 18 and the R/G dichroic mirror 19, respective red, green and blue lights incident on the R device 27, the G device 23 and the B device 31 in the LCOS projector 8A have wavelength bands shown with R2, G2 and B2 in (A) of FIG. 3, respectively. On the other hand, in the LCOS projector 8B, respective red, green and blue lights incident on the R device 27, the G device 23 and the B device 31 have wavelength bands shown with R1, G1 and B1 in (B) of FIG. 3, respectively. Therefore, the information about a color image formed on the screen 9 as a result of projecting lights through these projectors 8A and 8B is represented in a chromaticity diagram in (C) of FIG. 3, by its 6-primary color reproduction range obtained by linking six wavelength bands with each other. Obviously, this 6-primary color reproduction range is wider than the above 4-primary color reproduction range. Thus, it becomes possible to reproduce even hematic color, purple and cobalt blue, all of which could not be reproduced by the conventional RGB color reproduction display system. For this reason, the above-mentioned multi-primary color projection display device has begun to be used in an image evaluation where the quality of color reproduction plays a significant role, for instance, reproduction of art objects such as pictures and ceramic wares, reproduction of medical science images and so on.

In another prior art, there is also known a multi-color or three-dimensional display device which utilizes a RGB color band separation filter in addition to two projectors in piles (e.g. combination of one projector for audience's left eye and another projector for right eye) (see http://www2.aimet.ne.jp/nakahara/3dart/3generi9.html, Search Date: Oct. 9, 2007).

SUMMARY OF THE INVENTION

In common with the conventional optical system and projection display device of FIGS. 1 and 2, however, it is required to prepare two projectors 8A, 8B having optical characteristics different from each other in terms of separating and combining colors, as shown in (A), (B) of FIG. 3 and also supply the projectors 8A, 8B with different signals. Additionally, as respective images projected from the projectors 8A, 8B have to be combined on the screen 9 with respect to each pixel, the PJ lens 33 has to be designed with a projection distortion less than 0.05% (corresponding to a ratio of 1 pixel to 2000 pixels). Depending on a type of screen 9 to be installed, nevertheless, there is a possibility that a signal processing using CGP (Computer Graphic Processor) is required to correct a distortion in aligning respective images from the projectors 8A, 8B with each other.

In this way, the conventional optical system and projection display device are apt to be increased in manufacturing cost and complicated in structure due to the presence of two projectors 8A, 8B. Presently, the conventional optical system and projection display device is not actualized or embodied without grants-in-aid of any public institution, for instance, government.

The conventional optical system and projection display device have additional disadvantages. That is, as the projected images from two projectors 8A, 8B have to be superimposed on each other on the screen, the black level of the projected image is doubled due to the projectors 8A, 8B thereby to reduce contrast of the image to half. Consequently, the primary colors' reproduction is subjected to overlapping black (actually, dark gray), causing a cloudy image (in white-tinged primary colors) on the screen with a narrowed color reproduction range.

Under the above-mentioned problems, an object of the present invention is to provide an optical system which can provide high-contrast images, multi-primary color images and 3-dimensional images by a structure for first dividing a light, which has been combined after modulating ($1^{st}$. modulation) lights by the conventional 3-primary color devices, into halves and secondly modulating the so-divided lights by their exclusive signals ($2^{nd}$. modulation). Another object of the present invention is provide an optical system and a projection display device both of which are low in manufacturing cost, needless of the adjustment in superimposing images and which can display even 3-dimensional images on a screen.

In order to achieve the above objects, there is provided an optical system comprising: a modulation optical system for combining respective modulated primary color lights with each other in wavelength thereby to produce and output a first composite light, the respective modulated primary color lights being provided by modulating 3-primary color lights by 3-primary color signals produced from an image signal individually, a color spectroscope for transmitting and reflecting the first composite light thereby to divide it into a second composite light composed of a plurality of first primary color components each having a wavelength bandwidth narrower than that of the respective primary colors' lights, and a third composite light composed of a plurality of second primary color components each having a wavelength bandwidth narrower than that of the respective primary colors' lights and different from each of the wavelength bandwidths of the first primary color components; a modulator for modulating the second composite light by one of two kinds of luminance signals produced from the image signal thereby to produce a first modulation light and modulating the third composite light by the other of the luminance signals thereby to produce a second modulation light; a photosynthesizer for combining the first modulation light with the second modulation light thereby to produce a fourth composite light; and a projector for projecting the fourth composite light.

In order to achieve the above objects, there is also provided a projection display device comprising, using a plurality of first primary color signals corresponding to a plurality of first primary color components produced by an input image signal of an image to be displayed and a plurality of second primary color signals corresponding to a plurality of second primary color components whose light wavelength bands are different from those of the first primary color components, the device comprising: a first signal generator for generating a first band-unlimited luminance signal based on the first primary color signals and a second band-unlimited luminance signal based on the second primary color signals; a second signal generator for band-limiting the first and second primary color signals thereby to calculate a maximum of each of the first and second band-limited primary color signals with respect to each pixel and generating third and fourth band-limited luminance signals based on each of the first and second band-limited primary color signals; a third signal generator for generating: first and second color-signal correction coefficients based on the maximum of the each of the first and second band-limited primary color signals with respect to each pixel, the maximum obtained by the second signal generator, a first display luminance signal based on the maximum of the each of the first and second band-limited primary color signals with respect to each pixel and the first and third luminance signals, and a second display luminance signal based on the maximum of the each of the first and second band-limited primary color signals with respect to each pixel and the second and fourth luminance signals; a fourth signal generator for generating 3-primary color display signals, based on the first and second color-signal correction coefficients and the first and second band-limited primary color signals; a modulation optical system that wavelength-combines respective modulation primary color signals obtained by modulating the 3-primary color display signals with respect to each primary color thereby to produce and output a first composite light; a color spectroscope for dividing the first composite light into a second composite light composed of the first primary color components and a third composite light composed of the second primary color components thereby to emit the second and third composite lights; a modulator for modulating the second composite light by the first display luminance signal thereby to produce a first modulation light and modulating the third composite light by the second display luminance signal to produce a second modulation light; a photosynthesizer for combining the first modulation light with the second modulation light thereby to produce a fourth composite light; and projector means for projecting the fourth composite light

DETAILED DESCRIPTION OF THE PREFERRED EMBODIMENT

Embodiments of the present invention will be described with reference to drawings.

Figure 1:
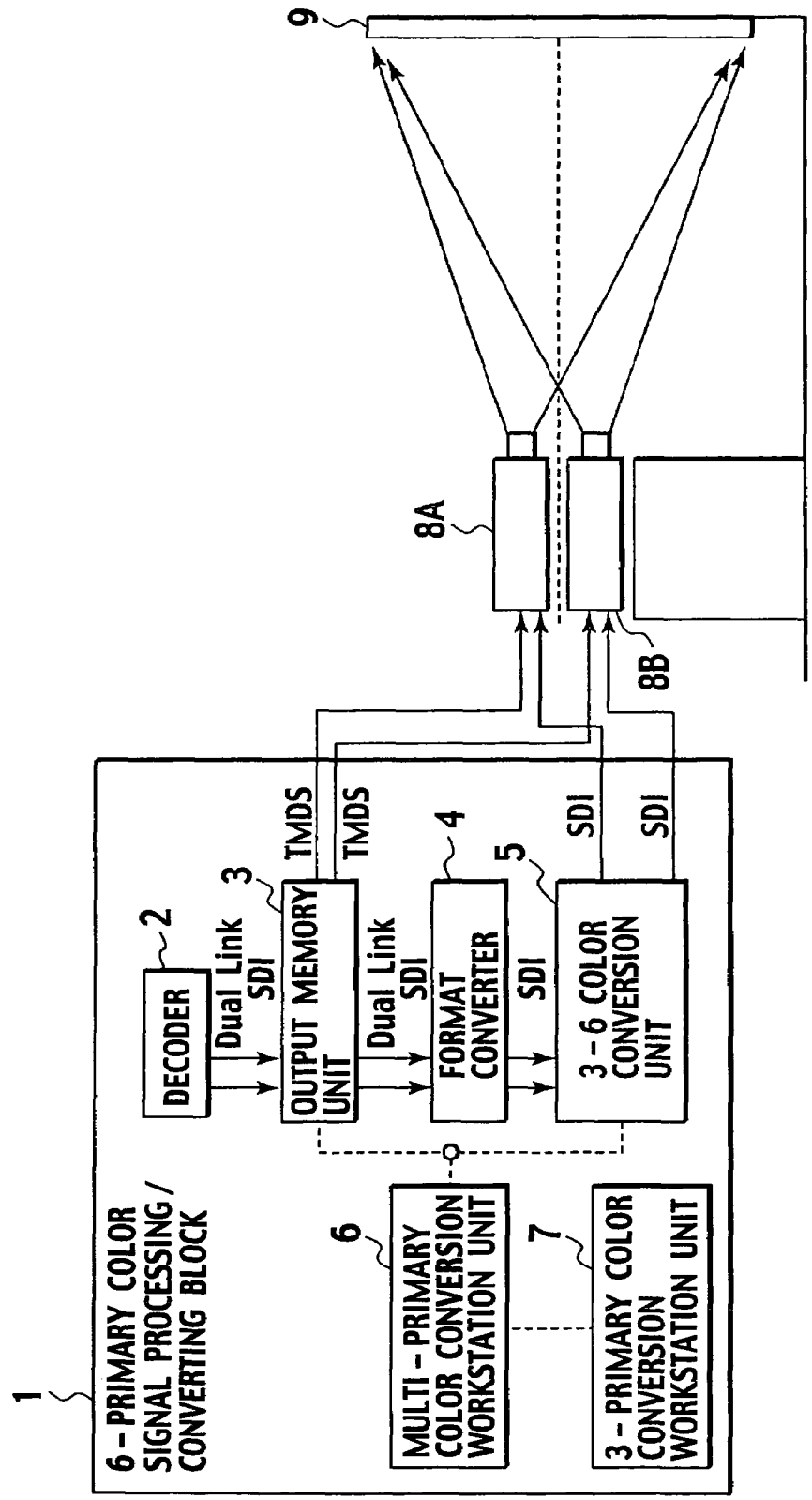
FIG. 1 is a structural view of a prior art projection display device.
Figure 2:
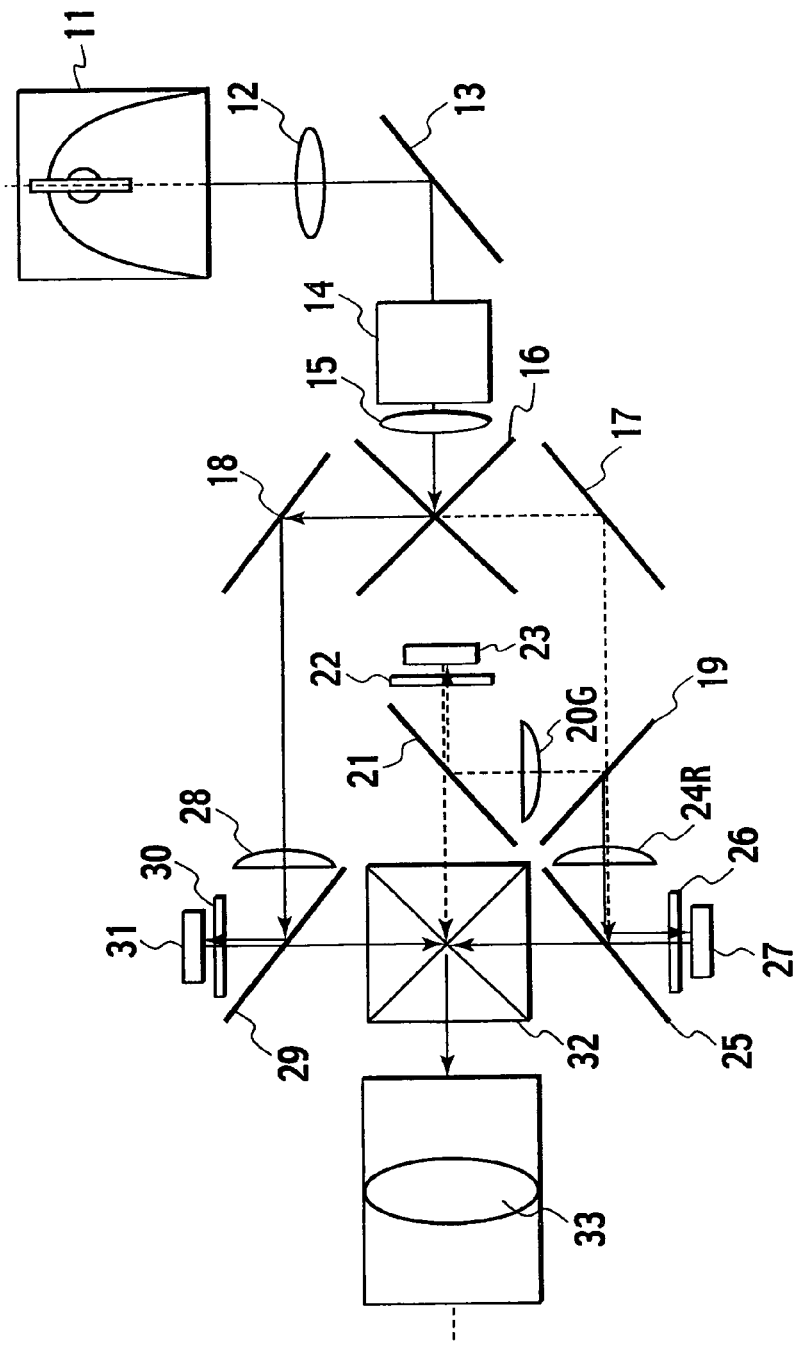
FIG. 2 is a structural view of a projector of FIG. 1.
Figure 3:
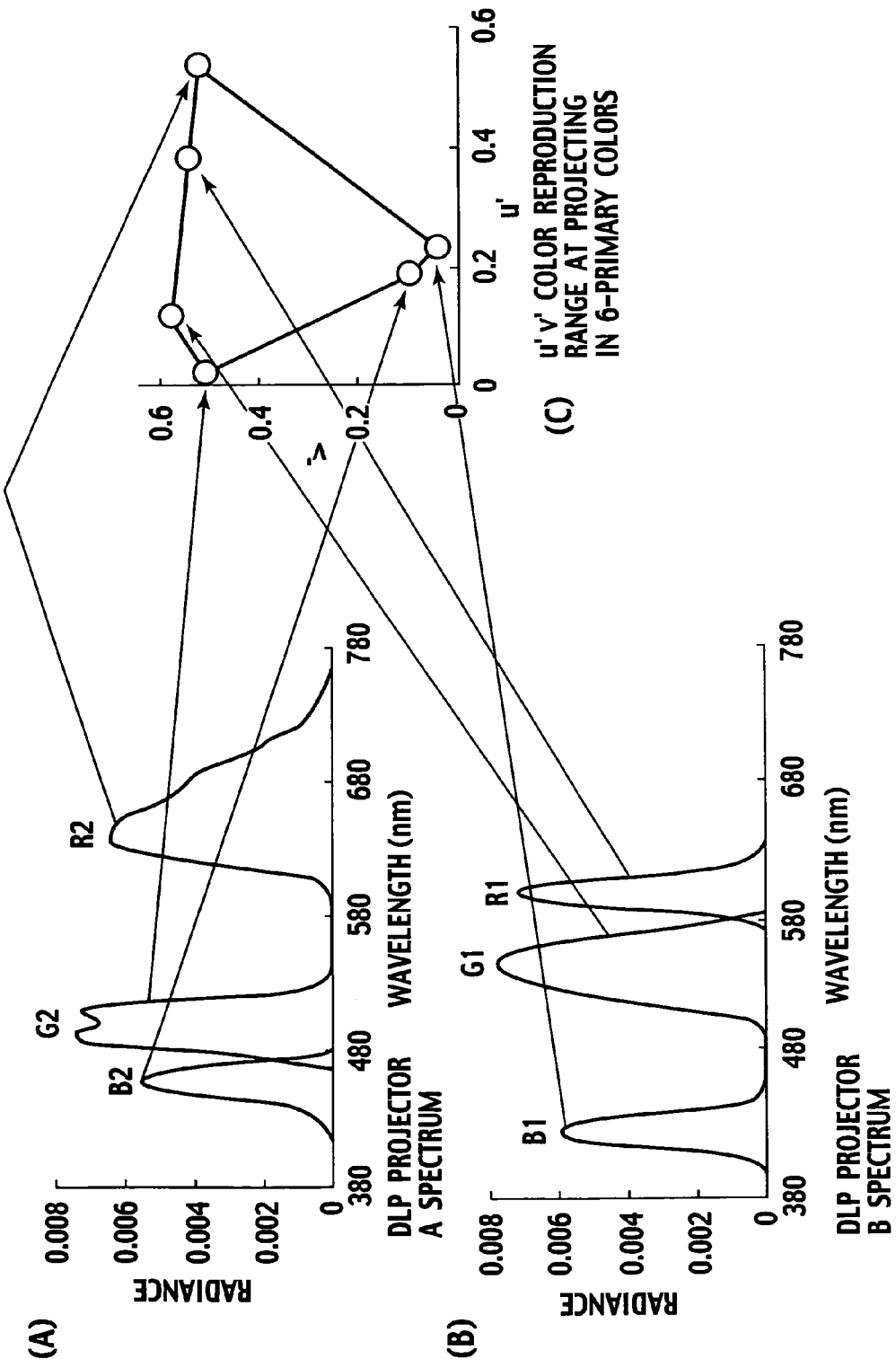
FIG. 3 is a diagram explaining a color reproduction range of the device of FIG. 1.
Figure 4:
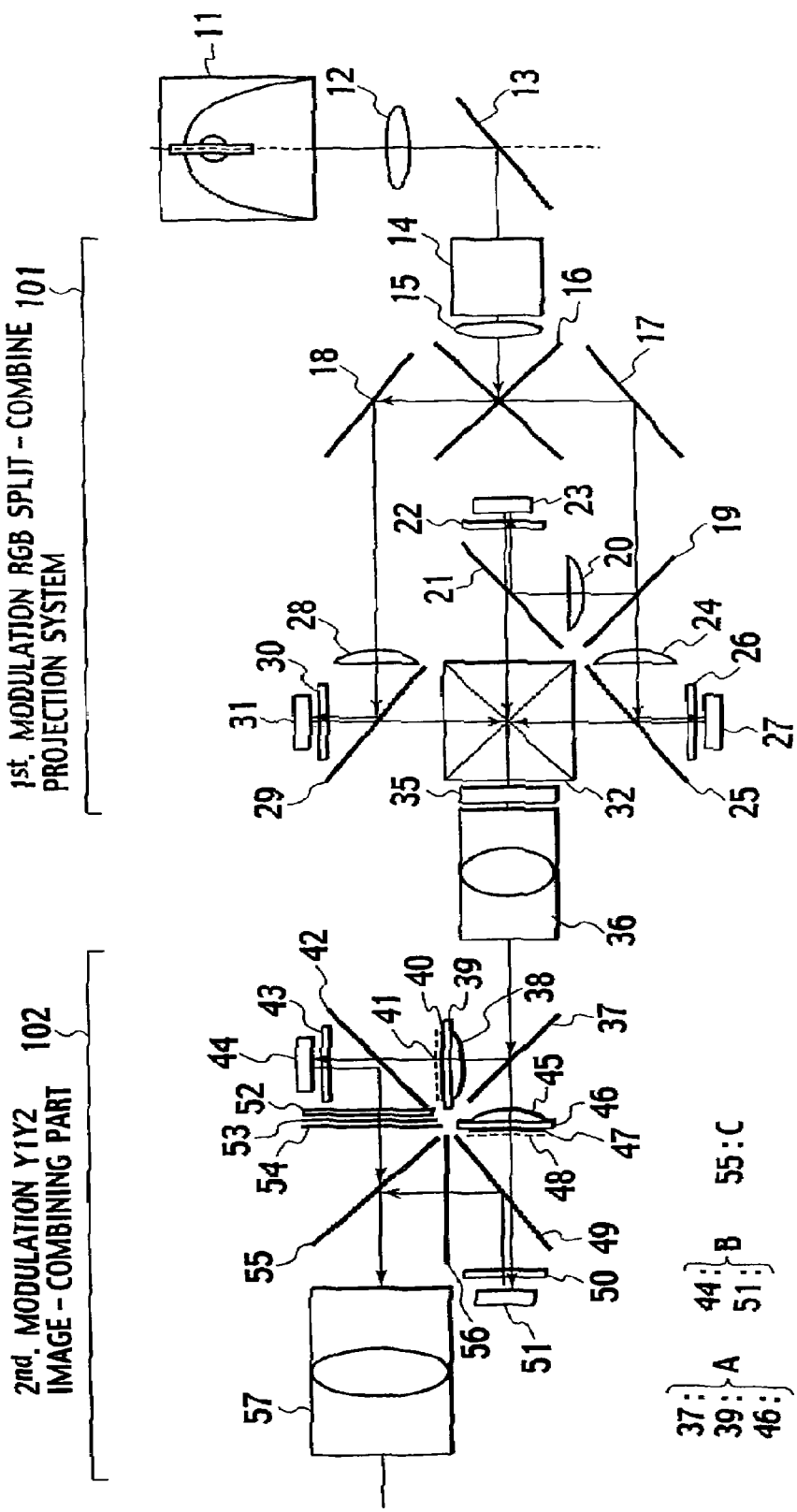
FIG. 4 is a structural view of an optical system in accordance with a first embodiment of the present invention.

FIG. 4 shows a constitution of an optical system in accordance with an embodiment of the present invention. In FIG. 4, elements identical to those of FIG. 2 are indicated with the same reference numerals respectively, and their descriptions are eliminated. The optical system of this embodiment comprises a first modulation optical system (RGB split-combine projection system) 101, a second modulation optical system (Y1Y2 image-combining part) 102, a quarter-wave plate 35 between the system 101 and the system 102 and a one-to-one (1:1) relay lens 36. The first modulation optical system 101 is adapted so as to modulate light by 3-primary color devices and is similar to the optical system of FIG. 1 without the PJ lens 33.

The quarter-wave plate 35 rotates an S-polarized light as being a composite light of 3-primary color lights from the RGB composite dichroic prism 32 of the first modulation light system 101 by an angle of λ/4. The so-rotated light is subsequently divided into two routes by a PS separation WG (wire grid) 37 in the second modulation optical system 102. In connection, it is also possible to change the P-S polarization split ratio by adjusting the rotating span of the quarter-wave plate 35. In place of the PJ lens 33, the 1:1 relay lens 36 is provided to project images on display devices in the second modulation optical system 102, that is, a Y1 device 44 and a Y2 device 51. In this way, the second modulation optical system 102 forms a remarkable feature of this embodiment.

In the embodiment, its unique constitution and operation will be described below. The composite light consisting of RGB primary color lights modulated by the system 101 is transmitted through the 1:1 relay lens 36 and further divided into a P-polarized light and an S-polarized light by the PS separation WG 37 (e.g. product named "Moxtek") as being a WG type polarization split element. The S-polarized light is transmitted through a Y1 field lens 38 for fine adjustment of an image to be formed on the Y1 device 44 in terms of size and position and enters a left-sided (L-side) wavelength spectral filter 39 to select left-sided primary color components from 3-primary color lights shown in FIG. 5. That is, there are selected a red light component R1 of 615 nm in wavelength, a green light component G1 of 515 nm in wavelength and a blue light component B1 of 450 nm in wavelength, in the illustrated example.

The S-polarized light of 3-primary color light components R1, G1 and B1 is shifted in wavelength of half-wave by a half-wave plate 40 to become a P-polarized light once. Thereafter, in order to enhance its optical quenching ratio, unnecessary S-polarized light component is eliminated from the P-polarized light by an analyzer 41. Then, through a Y1 WG (wire grid) 42 and a Y1 wavelength plate (retarder) 43 for regulating a phase of the light, it enters the Y1 device 44, attaining an image formation on modulation.

Figure 5:
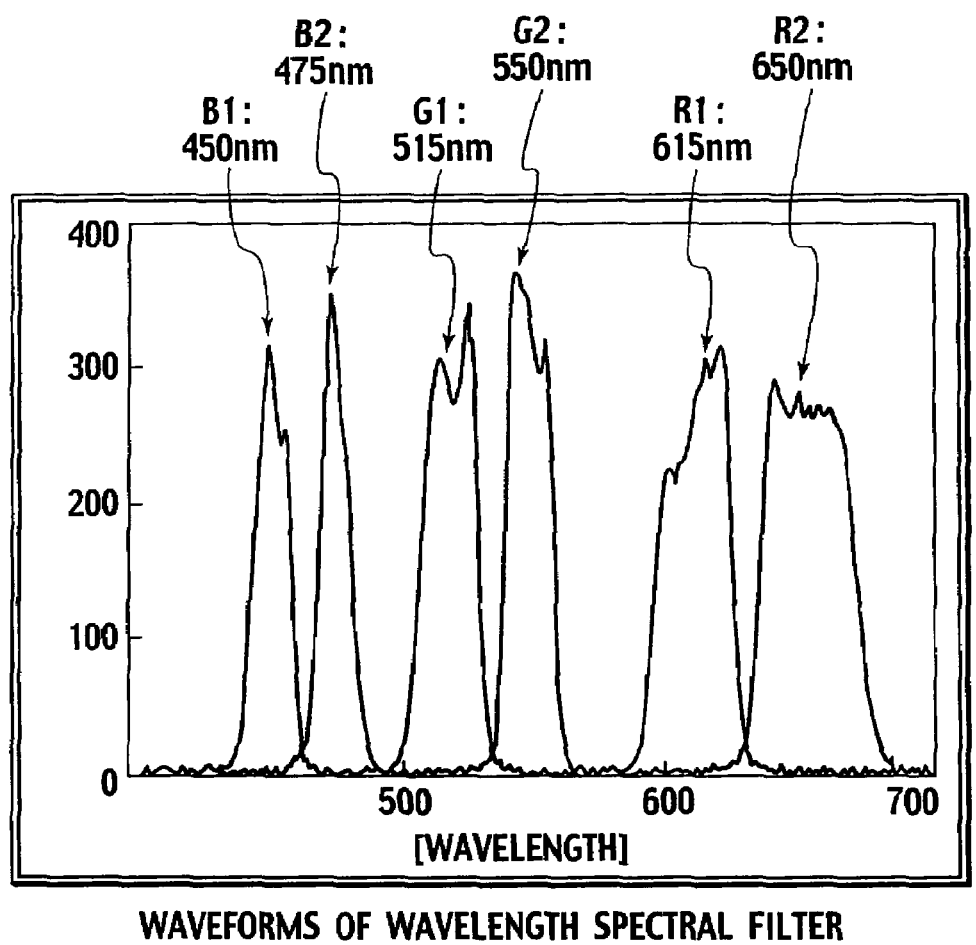
FIG. 5 is a diagram explaining the spectral sensitivity characteristic of a wavelength spectral filter of FIG. 4.

On the other hand, the P-polarized light from the PS separation WG 37 is transmitted through a Y2 field lens 45 for fine adjustment of an image to be formed on the Y2 device 51 in terms of size and position and enters a right-sided (R-side) wavelength spectral filter 46 to select right-sided primary colors components from 3-primary color lights shown in FIG. 5. That is, there are selected a red light component R2 of 650 nm in wavelength, a green light component G2 of 550 nm in wavelength and a blue light component B2 of 475 nm in wavelength, in the illustrated example.

Then, the P-polarized light of 3-primary color light components R2, G2 and B2 enters a Y2 aberration correcting lens 47 to correct an aberration produced since the light emitted from the 1:1 relay lens 36 is transmitted through the PS separation WG 37 and a later-mentioned Y2 WG 49. The Y2 aberration correcting lens 47 is formed by either a cylindrical lens or a wedge glass, for example. Note that in FIG. 4 a color spectroscope A includes the PS seperation WG 37, the L-side wavelength spectral filter 39 and the R-side wavelength spectral filter 46.

Thereafter, in order to enhance its optical quenching ratio, unnecessary S-polarized light component is eliminated from the P-polarized light transmitted through the aberration correcting lens 47 by an analyzer 48. Then, through a Y2 WG 49 and a Y2 wavelength plate (retarder) 50 for regulating a phase of the light, it enters the Y2 device 51, attaining an image formation on modulation. In this embodiment, LCOS (Liquid Crystal on Silicon) with e.g. 4,096 pixels in the horizontal direction and 2,160 pixels in the vertical direction may be used for the Y1 device 44 and the Y2 device 51, as well as the G device 23, the R device 27 and the B device 31. Note that in FIG. 4 (and FIGS. 7, 8 and 9) a modulator B includes the Y1 device 44 and the Y2 device 51.

The S-polarized light modulated by the Y1 device 44 is transmitted through the Y1 wavelength plate 43 and further reflected by the Y1 WG 42 and enters a Y1 aberration correcting lens 52 to correct an astigmatism in passing through a PS composite WG 55 to which an optical axis is slanted by 45 degrees. The Y1 aberration correcting lens 52 is formed by either a cylindrical lens or a wedge glass, for example. The S-polarized light transmitted through the Y1 aberration correcting lens 52 is returned to a P-polarized light by a half-wave plate 53. Thereafter, in order to maintain high contrast, P-polarized light component (in actual, unnecessary S-polarized light component as the light passes through the plate 53) is eliminated from the S-polarized light reflected by the Y1 WG 42 by an analyzer 54 (P-polarized light: permeable; S-polarized light: impermeable). Note that in (A) and (B) of FIG. 7 a spectroscope A includes the dichroic mirror 60 and a photosynthesizer C includes the dichroic mirror 61. Then, the so-filtered light enters the PS composite WG 55. Note that the Y1 analyzer 54 is inclined to a lens optical axis by approx. 10 degrees so that a reflection light from the analyzer 54 does not return to the Y1 device 44.

On the other hand, the S-polarized light modulated by the Y2 device 51 is transmitted through the Y2 wavelength plate 50 and further reflected by the Y2 WG 49 and enters a Y2 analyzer 56 to eliminate P-polarized light component from the S-polarized light. Then, the so-filtered light enters the PS composite WG 55. Note that the Y2 analyzer 56 is also inclined to a lens optical axis by approx. 10 degrees so that a reflection light from the analyzer 54 does not return to the Y2 device 51.

The PS composite WG 55 combines the P-polarized light modulated by the Y1 device 44 and successively transmitted through the Y1 analyzer 54 with the S-polarized light modulated by the Y2 device 51 and successively transmitted through the Y2 analyzer 56. The resulting composite light is projected on a screen (not shown) through a Y1Y2 projector lens 57. Besides, the Y1 device 44 and the Y2 device 51 are adapted so as to be displaced by micro-motors, allowing their characteristics to be identical to each other in terms of the number of pixels. Note that in FIG. 4 (and FIGS. 8 and 9) a photosynthesizer C includes the PS composite WG 55.

In this way, according to the embodiment, the composite light (RGB primary color lights) from the RGB composite dichroic prism 32 is once divided, through the L-side wavelength spectral filter 39 and the R-side wavelength spectral filter 46 in the second modulation optical system 102, into the first 3-primary color light (light components R1, G1, B1) and the second 3-primary color light (light components R2, G2, B2) and thereafter, images are formed on the Y1 device 44 and the Y2 device 51 for modulation. Thus, as respective modulated lights from the devices 44, 52 are again combined with each other by the PS composite WG 55, a 6-primary color image is projected on the screen.

Figure 6:
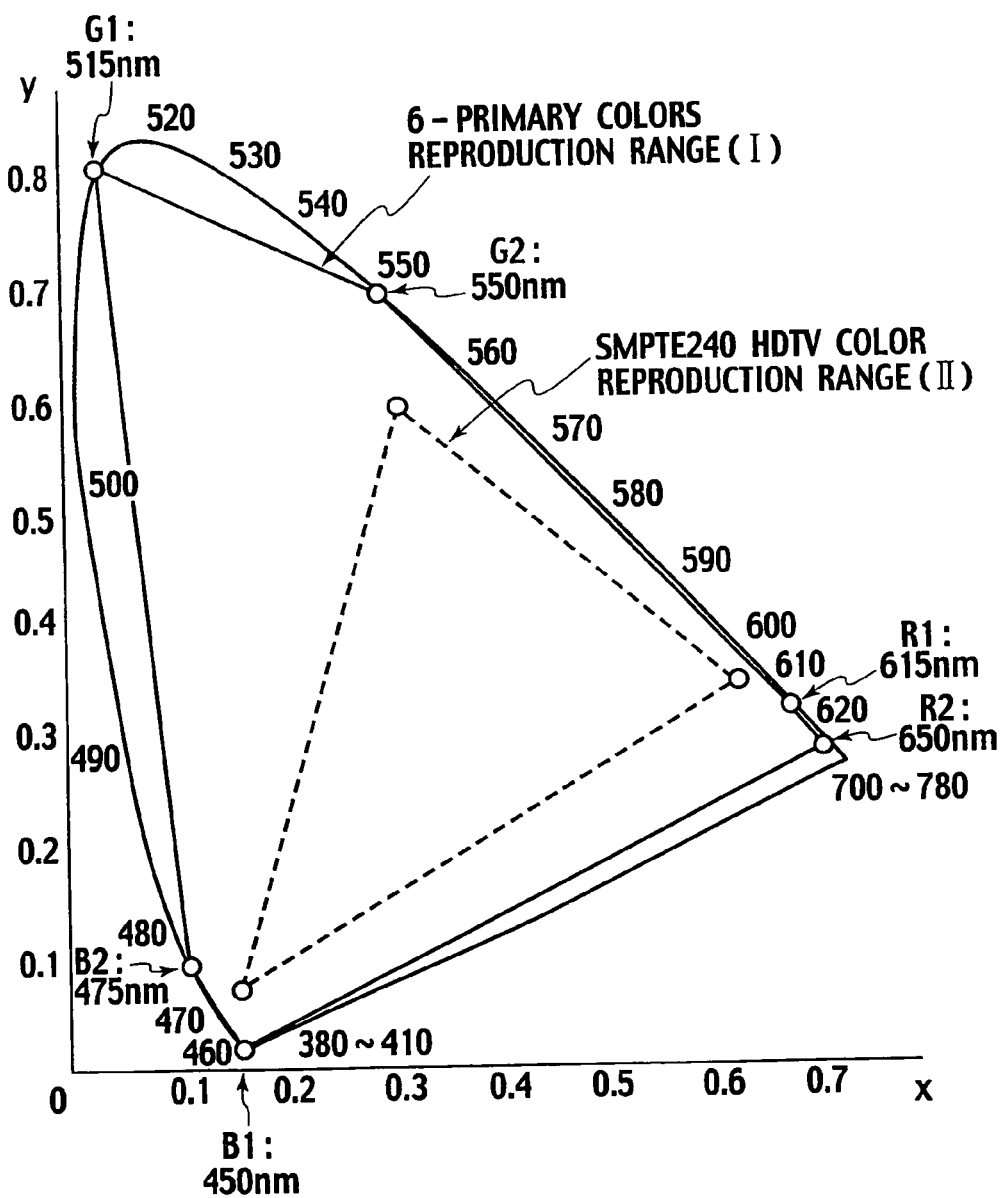
FIG. 6 is a general X-Y chromaticity diagram defined by IEC390 and a color reproduction range etc. of the first embodiment of the present invention.

FIG. 6 is a general X-Y chromaticity diagram defined by IEC390. This X-Y chromaticity diagram shows a color gamut that a human being is capable of detecting. Although the reproducible color gamut for a display device, a projector or the like is believed to be wide as possible, the actual reproducible color gamut for the display almost falls from 420 nm to 700 nm by reason that light having a wavelength less than 420 nm (near UV light) and light having a wavelength more than 700 nm (near infrared light) should be filtered in view of ensuring the safety against human bodies and the reliability of optical components.

Now, as the above-mentioned 6-primary colors of this embodiment comprise R1 (615 nm), G1 (515 nm), B1 (450 nm), R2 (650 nm), G2 (550 nm) and B2 (475 nm) shown in FIG. 5, an area surrounded by solid lines joining respective points R1, G1, B1, R2, G2 and B2 of FIG. 6 corresponds to the reproducible color gamut I of this embodiment. It will be appreciated from FIG. 6 that the reproducible color gamut I of this embodiment is broader than (more than twice as broad) the reproducible color gamut II for HDTV defined by SMPTE240 (shown with a triangle of broken lines) and also extends up to more than 90% of the reproducible color gamut that a human being is capable of detecting, accomplishing remarkably-broad color reproduction in comparison with the conventional system.

In the modification, the L-side wavelength spectral filter 39 may be arranged in front of the analyzer 41 on the incident side of the Y1 device 44 or in front of the Y1 analyzer 54 on the emission side of the Y1 device 44. Similarly, the R-side wavelength spectral filter 46 may be arranged in front of the analyzer 48 on the incident side of the Y2 device 51 or in front of the Y2 analyzer 56 on the emission side of the Y2 device 51.

In the illustrated embodiment, LCOS having 4,096 pixels in the horizontal direction and 2,160 pixels in the vertical direction, whose resolving power is equal to that of the Y1 device 44 and the Y2 device 51, is adopted for the G device 23, the R device 27 and the B device 31. However, each of these devices 23, 27, 31 in the first modulation optical system 101 may be provided with lower resolving power (e.g. elements corresponding to HDTV having 2,048 pixels in the horizontal direction and 1,080 pixels in the vertical direction) since the devices are adapted so as to operate in chrominance. It is noted that the resolving power of an image modulated by the Y1 devices 44 and the Y2 device 51 depends on respective resolving powers of the Y1 devices 44 and the Y2 device 51 finally.

The second and third embodiments of the invention will be described below.

Figure 7:
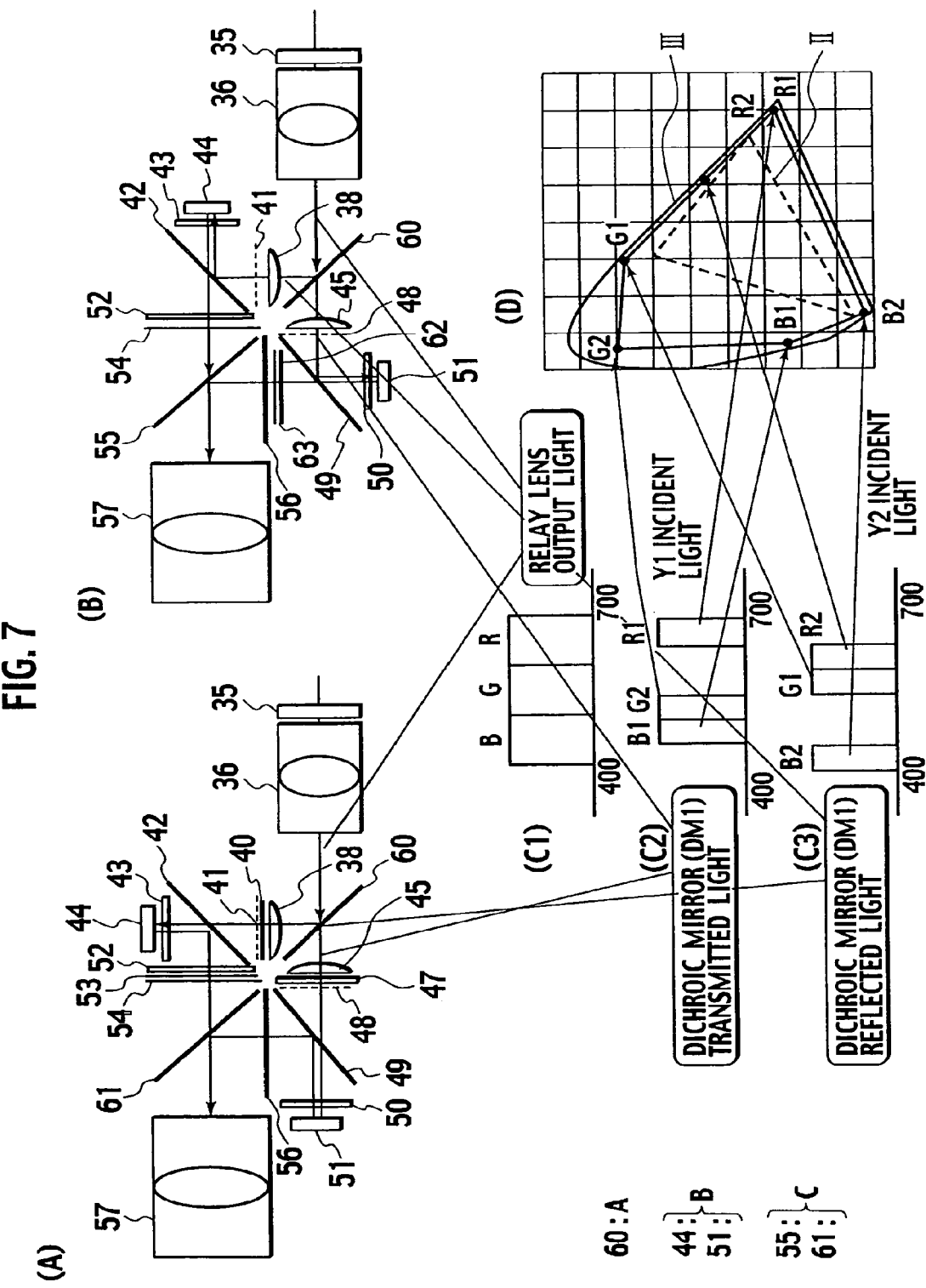
FIG. 7 is a view having structural views of substantial parts of the optical systems in accordance with second and third embodiments of the present invention, a band-separation characteristic view of a dichroic mirror and an X-Y chromaticity diagram, in combination.

FIG. 7 is a combination diagram of the second embodiment shown with a part (A) and the third embodiment shown with a part (B). In FIG. 7, the part (A) shows a constitution of a substantial part of the optical system in accordance with the second embodiment, while the part (B) shows a constitution of a substantial part of the optical system in accordance with the third embodiment. In common with the parts (A) and (B), a dichroic mirror (DM) is adopted as a color separator.

According to the second embodiment shown in (A) of FIG. 7, the optical system does not employ the wavelength spectral filters 39, 46 in the second modulation optical system 102 of FIG. 4. Instead, there are arranged a dichroic mirror 60 and a dichroic mirror 61 in place of the PS separation WG 37 and the PS composite WG 55 of the first embodiment in order to realize 6-primary colors.

In (A) of FIG. 7, the composite light as a result of combining 3-primary colors RGB all modulated in the first modulation optical system 101 (FIG. 4) has a spectrum shown in (C1) of FIG. 7. This composite light is transmitted through the 1:1 relay lens 36 thereby to enter the first dichroic mirror (DM1) 60. At the first dichroic mirror (DM1) 60, the red light component R1 having a wavelength of 615 nm, the green light component G2 having a wavelength of 550 nm and the blue light component B1 having a wavelength of 450 nm, all of which are shown in (C2) of FIG. 7, are transmitted through the first dichroic mirror (DM1) 60. While, the red light component R2 having a wavelength of 650 nm, the green light component G1 having a wavelength of 515 nm and the blue light component B2 having a wavelength of 475 nm, all of which are shown in (C3) of FIG. 7 are reflected by the first dichroic mirror (DM1) 60.

Through the Y1 field lens 38, the half-wave plate 40, the analyzer 41, the Y1 WG 42 and the Y1 wavelength plate 43 in this order, the reflected composite light of the components R2, G1, B2 enters the Y1 device 44 to form an image on modulation. On the other hand, the composite light of the components R1, G2, B1 transmitted through the first dichroic mirror (DM1) 60 enters the Y2 device 51 to form an image on modulation through the Y2 field lens 45, the aberration correcting lens 47, the analyzer 48, the Y2 WG 49 and the Y2 wavelength plate 50 in this order.

Then, the S-polarized light emitted from the Y1 device 44 for modulation is transmitted through the Y1 wavelength plate 43 and further reflected by the Y1 WG 42. Then, the S-polarized light is changed to a P-polarized light through the Y1 aberration correcting lens 52, the half-wave plate 53 and the Y1 analyzer 54 thereby to enter the second dichroic mirror (DM2) 61. On the other hand, the S-polarized light emitted from the Y2 device 51 for modulation is transmitted through the Y1 wavelength plate 50 and further reflected by the Y2 WG 49. Then, the so-reflected S-polarized light enters the second dichroic mirror (DM2) 61 through the Y2 analyzer 56.

The second dichroic mirror (DM2) 61 is established so as to be opposite to the first dichroic mirror (DM1) 60 in terms of transmittance-reflectance characteristics. Therefore, one light, which is composed of wavelength light components reflected by the dichroic mirror (DM1) 60 and further modulated by the Y1 device 44 after being changed to a P-polarized light by the half-wave plate 53, is transmitted through the dichroic mirror (DM2) 61. While, the S-polarized light, which is composed of wavelength light components transmitted through the dichroic mirror (DM1) 60 and modulated by the Y2 device 51, is reflected by the dichroic mirror (DM2) 61. Consequently, at the dichroic mirror (DM2) 61, the former light and the latter S-polarized light are combined with each other and subsequently projected on a not-shown screen by the Y1Y2 projector lens 57.

The X-Y chromaticity diagram of light of the second embodiment is illustrated by a reproducible color gamut III shown with solid lines in (D) of FIG. 7. The color gamut III is provided with a periphery extending from violet (wavelength: 400 nm) up to crimson (wavelength: 700 nm), representing a remarkably broad reproducible color gamut in comparison with the reproducible color gamut II under HDTV (SMPTE240) standard on general use. In addition, as the system of the second embodiment does not adopt the wavelength spectral filters 39, 46, the PS separation WG 37 and the PS composite WG 55 of the first embodiment, the transmission efficiency gets better thereby to improve the light utilization efficiency. In connection with the second embodiment, the dichroic mirrors 60, 62 may be replaced by wavelength selection filters or the like (e.g. "Color-Select" -registered trademark).

The third embodiment of the invention will be described with reference to (B) of FIG. 7. The third embodiment differs from the first embodiment in the arrangement of the Y1 device 44 and the Y2 device 51. In addition, the lights emitted from the Y1 device 44 and the Y2 device 51 are transmitted through the Y1 WG 42 and the Y2 WG 49, respectively. The dichroic mirror 61 of the second embodiment is replaced by the PS composite WG 55.

In (B) of FIG. 7, the reflected composite light of the components R2, G1, B2 from the dichroic mirror (DM1) 60 is transmitted through the Y1 field lens 38 and the analyzer 41 thereby to become an S-polarized light. This light is subsequently reflected by the Y1 WG 42 and further transmitted through the Y1 wavelength plate 43 thereby to enter the Y1 device 44 to form an image on modulation. On the other hand, the transmitted composite light of the components R1, G2, B1 through the dichroic mirror (DM1) 60 is transmitted through the Y2 field lens 45 and the analyzer 48 thereby to become an S-polarized light. This light is subsequently reflected by the Y2 WG 49 and further transmitted through the Y2 wavelength plate 50 thereby to enter the Y2 device 51 to form an image on modulation.

The Y1 device 44 emits a modulated P-polarized light. The P-polarized light is transmitted through the Y1 wavelength plate 43, the Y1 WG 42, the Y1 aberration correcting lens 52 and the Y1 analyzer 54 thereby to enter the PS composite WG 55. On the other hand, the Y2 device 51 emits a modulated P-polarized light. Then, the P-polarized light enters the half-wave plate 63 through the Y2 aberration correcting lens 62 thereby to become an S-polarized light. In the S-polarized light, its unnecessary components are eliminated by the Y2 analyzer 56 and thereafter, the so-filtered light enters the PS composite WG 55. Then, the PS composite WG 55 combines the P-polarized light from the Y1 analyzer 54 with the S-polled light from the Y2 analyzer 56 and further projects a resulting composite light onto a not-shown screen through the Y1Y2 projector lens 57.

The X-Y chromaticity diagram of light of the third embodiment is illustrated by a reproducible color gamut III shown with solid lines in (D) of FIG. 7 as well as the second embodiment of (A). The color gamut III is provided with a periphery extending from violet (wavelength: 400 nm) up to crimson (wavelength: 700 nm), representing a remarkably broad reproducible color gamut in comparison with the reproducible color gamut II under HDTV (SMPTE240) standard on general use.

While the second embodiment shown in (B) of FIG. 7 requires a large-sized and high-precision dichroic mirror since the arrangement close to the Y1Y2 projector lens 57 causes image light to be diffused, the third embodiment is advantageous in constitution due to the adoption of the PS composite WG 55. Nevertheless, it should be noted that the half-wave plate 63 and the Y2 aberration correcting lens 62 have to be arranged on the side of the Y2 device 51 due to the adoption of PS composite system.

The fourth embodiment of the present invention will be described with reference to FIG. 8.

Figure 8:
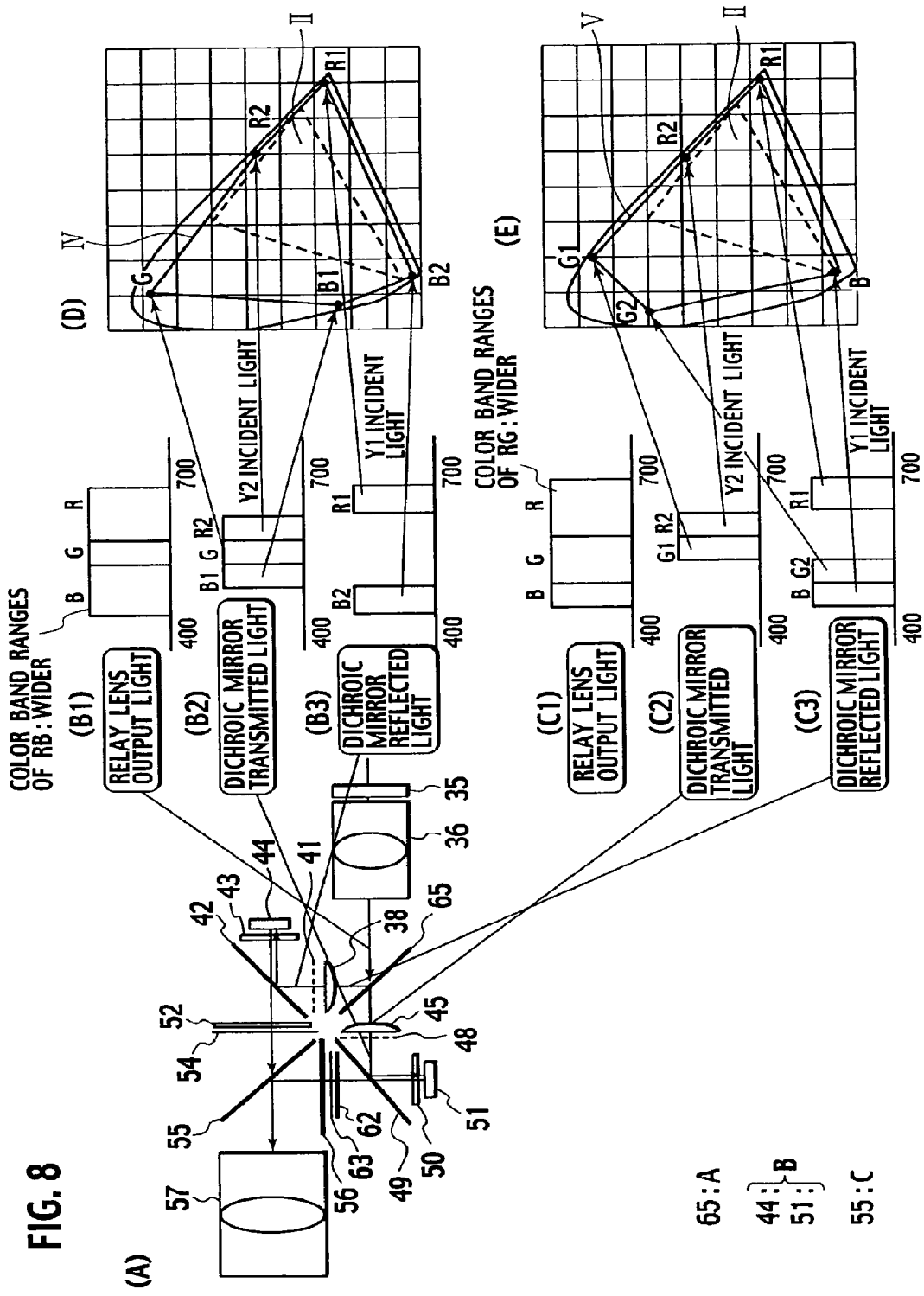
FIG. 8 is a view having a structural view of a substantial part of the optical system in accordance with a fourth embodiment of the present invention, a band-separation characteristic view of a dichroic mirror and an X-Y chromaticity diagram, in combination.

In FIG. 8, a part (A) shows a constitution of the substantial part of the optical system in accordance with the fourth embodiment of the present invention. In the fourth embodiment, elements identical to those of the third embodiment in (B) of FIG. 7 are indicated with the same reference numerals and their overlapping descriptions are eliminated. The feature of the fourth embodiment resides in the provision of a dichroic mirror 65 having the band-separation characteristic in (B2), (B3) of FIG. 8 or (C2), (C3) of FIG. 8 in place of the dichroic mirror 60 of the third embodiment. Note that in FIG. 8 a color spectroscope A includes the dichroic mirror 65.

In (A) of FIG. 8, the composite light from the first modulation optical system 101 (FIG. 4) has a spectrum shown in (B1) of FIG. 8. This composite light is transmitted through the 1:1 relay lens 36 thereby to enter the dichroic mirror 65 through which the red light component R2, the green light component G and the blue light component B1 are transmitted as shown in (B2) of FIG. 8 and on which the red light component R1 and the blue light component B2 are reflected as shown in (B3) of FIG. 8.

The reflected composite light of the components R1 and B2 from the dichroic mirror 65 is transmitted through the Y1 field lens 38 and the analyzer 41 thereby to become an S-polarized light. This light is subsequently reflected by the Y1 WG 42 and further transmitted through the Y1 wavelength plate 43 thereby to enter the Y1 device 44 to form an image on modulation. On the other hand, the transmitted composite light of the components R2, G, B1 through the dichroic mirror 65 is transmitted through the Y2 field lens 45 and the analyzer 48 thereby to become an S-polarized light. This light is subsequently reflected by the Y2 WG 49 and further transmitted through the Y2 wavelength plate 50 thereby to enter the Y2 device 51 to form an image on modulation.

The lights modulated by the Y1 device 44 and the Y2 device 51 are transmitted through the similar optical system to the third embodiment and subsequently subjected to PS composition. Thereafter, the resulting composite light is projected on a screen (not shown) through the Y1Y2 projector lens 57.

In the fourth embodiment of (A) of FIG. 8, as shown with a spectrum in (B1) of FIG. 8, if the incident light from the first modulation optical system has the red light band (R) and the blue light band (B) established broader than the green light band (G), the dichroic mirror 65 has a band-separation characteristic to divide the red light band and the blue light band into halves respectively. Consequently, the X-Y chromaticity diagram of light of the fourth embodiment represents a reproducible color gamut of five primary colors shown with solid line IV in (D) of FIG. 8. Obviously, this reproducible color gamut of five primary colors is broader than the reproducible color gamut II under HDTV (SMPTE240) standard on general use, accomplishing an accurate color reproduction in comparison with HDTV (SMPTE240) standard.

In the fourth embodiment in (A) of FIG. 8, alternatively, the dichroic mirror 65 may be provided with a band-separation characteristic shown in (C2), (C3) of FIG. 8. This modification is directed to a situation where the incident light from the first modulation optical system has the green light band (G) and the red light band (R) each established broader than the blue light band (B), as shown with the spectrum of (C1) of FIG. 8.

Then, as shown in (C2), (C3) of FIG. 8, the dichroic mirror 65 has a band-separation characteristic to divide the green light band and the red light band into halves respectively. That is, the green light component G1 and the red light component R2 are transmitted through the dichroic mirror 65, as shown in (C2) of FIG. 8. On the contrary, the blue light component B, the green light component G2 and the red light component R1 are reflected by the dichroic mirror 65, as shown in (C3) of FIG. 8.

Consequently, the X-Y chromaticity diagram of light of this modification represents a reproducible color gamut of five primary colors shown with a solid line V in (E) of FIG. 8. Obviously, this reproducible color gamut of five primary colors is broader than the reproducible color gamut II under HDTV (SMPTE240) standard on general use, accomplishing an accurate color reproduction in comparison with HDTV (SMPTE240) standard.

It is noted that a decision which band-separation characteristic (either (B2), (B3) of FIG. 5 or (C2), (C3) of FIG. 5) to adopt for the dichroic mirror 65 depends on which color to be emphasized. Alternatively, of course, the red light band may be single without being divided into halves.

The fifth embodiment of the present invention will be described with reference to FIG. 9.

Figure 9:
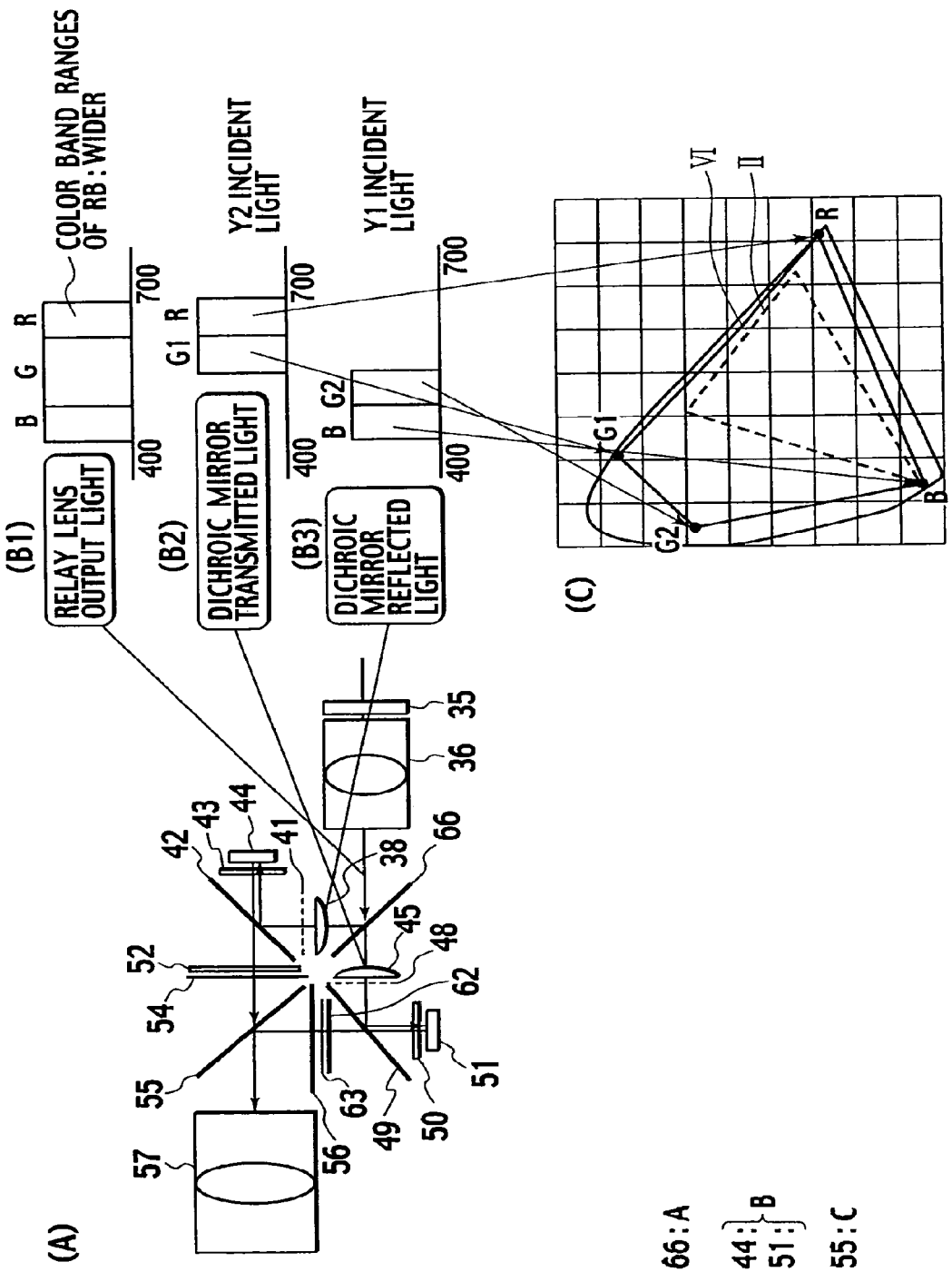
FIG. 9 is a view having a structural view of a substantial part of the optical system in accordance with a fifth embodiment of the present invention, a band-separation characteristic view of a dichroic mirror and an X-Y chromaticity diagram, in combination.

In FIG. 9, a part (B) shows a constitution of the substantial part of the optical system in accordance with the fifth embodiment of the present invention. In the fifth embodiment, elements identical to those of the fourth embodiment in (B) of FIG. 8 are indicated with the same reference numerals and their overlapping descriptions are eliminated. The feature of the fifth embodiment resides in the provision of a dichroic mirror 66 having the band-separation characteristic in (B2), (B3) of FIG. 9 in place of the dichroic mirror 60 of the third embodiment. Note that in FIG. 9 a color spectroscope A includes the dichroic mirror 66.

In (A) of FIG. 9, the composite light from the first modulation optical system 101 (FIG. 4) has a spectra shown in (B1) of FIG. 9. This composite light is transmitted through the 1:1 relay lens 36 thereby to enter the dichroic mirror 66 through which the green light component G1 and the red light component R are transmitted as shown in (B2) of FIG. 9 and on which the blue light component B and the green light component G2 are reflected as shown in (B3) of FIG. 9.

The reflected composite light of the components R and G1 from the dichroic mirror 66 is transmitted through the Y1 field lens 38 and the analyzer 41 thereby to become an S-polarized light. This light is subsequently reflected by the Y1 WG 42 and further transmitted through the Y1 wavelength plate 43 thereby to enter the Y1 device 44 to form an image on modulation. On the other hand, the transmitted composite light of the components B, G2 through the dichroic mirror 66 is transmitted through the Y2 field lens 45 and the analyzer 48 thereby to become an S-polarized light. This light is subsequently reflected by the Y2 WG 49 and further transmitted through the Y2 wavelength plate 50 thereby to enter the Y2 device 51 to form an image on modulation.

The lights modulated by the Y1 device 44 and the Y2 device 51 are transmitted through the similar optical system to the third and fourth embodiments and subsequently subjected to PS composition. Thereafter, the resulting composite light is projected on a screen (not shown) through the Y1Y2 projector lens 57.

The fifth embodiment in (A) of FIG. 9 is directed to a situation where the incident light from the first modulation optical system has the green light band (G) established broader than the blue light band (B) and the red light band (R), as shown with the spectrum in (B1) of FIG. 9. In the ninth embodiment, therefore, the dichroic mirror 66 has a band-separation characteristic to divide the green light band into halves, as shown in (B2), (B3) of FIG. 9.

Consequently, the X-Y chromaticity diagram of light of the fifth embodiment represents a reproducible color gamut of 4-primary colors shown with a solid line VI in (C) of FIG. 9. Save and except the vicinity of a light wavelength of 520 nm, this reproducible color gamut of 4-primary colors is broader than the reproducible color gamut II under HDTV (SMPTE240) standard on general use, accomplishing an accurate color reproduction in comparison with HDTV standard.

It is noted that the reproducible color gamut of 4-primary colors could be attained by the dichroic mirror's dividing of either the blue light band or the red light band into halves. In view of increasing the reproducible color gamut as possible, however, it is more advantageous to expand the green light band rather than the blue light band or the red light band because the X-Y chromaticity diagram is apt to spread toward the green light band broad, as it will be obvious from (C) of FIG. 9.

Figure 10:
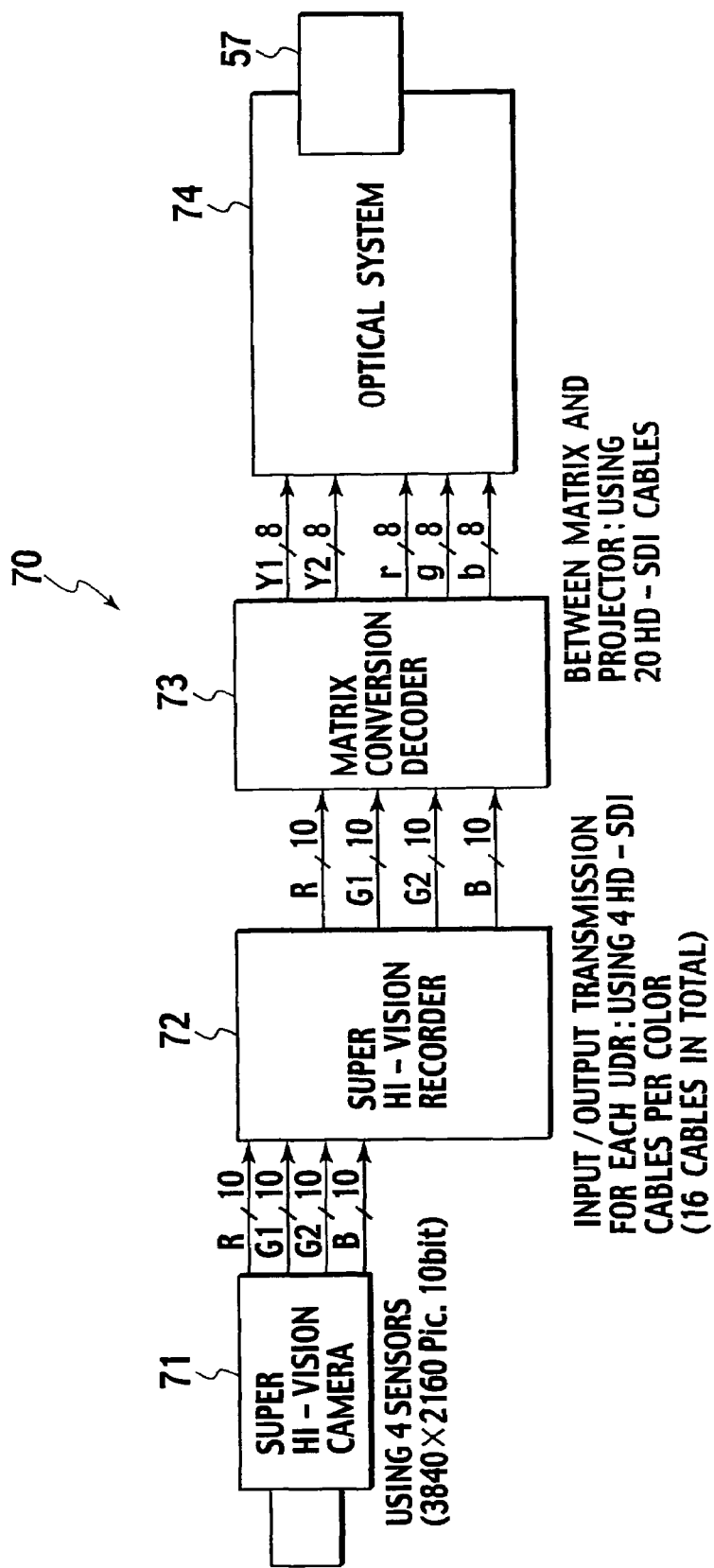
FIG. 10 is a block diagram of a projection display device in accordance with an embodiment of the present invention.

Next, a projection display device of the present invention will be described below. FIG. 10 is a block diagram of the projection display device in accordance with an embodiment of the present invention. In FIG. 10, the projection display device 70 comprises a Super Hi-Vision camera 71 for taking a picture of a desired object, a Super Hi-Vision recorder 72 for recording and reproducing imaging signals of the Super Hi-Vision camera 71, a matrix conversion decoder 73 that inputs green signals G1 and G2, a red signal R and a blue signal B from the recorder 72 and outputs two kinds of luminance signals Y1, Y2 and color signals "r", "g" and "b" as a result of matrix conversion of the above input signals and an optical system 74 for projecting an optical image on a not-shown screen. Besides, 6-primary color lights produced from a computer image, a film image, etc. may be used in place of the Super Hi-Vision camera 71 of FIG. 10. Here, the Super Hi-Vision is one of a LSDI (Large Screen Digital Imagery) system with 7680×4320 pixels specified in Recommendation ITU-R BT.1769 "parameter values for an expanded hierarchy of LSDI image formats for production and international program exchange".

Having a G-dichroic filter for dual optical wavelengths and four pieces of solid-state image sensing devices (two for green light; one for red light; and one for blue light) each having 3,840 pixels in the horizontal direction and 2,160 pixels in the vertical direction (i.e. 4 kpixels), for example, the Super Hi-Vision camera 71 is adapted so that each solid-state image sensing device outputs primary color signals of 10 bits. The optical system 74 corresponds to one system to be selected from the embodiments described with reference to FIGS. 4 to 9 optionally. The matrix conversion decoder 73 is adapted so as to provide five kinds of signals, that is, the above luminance signals Y1, Y2 and the color signals "r", "g" and "b".

Figure 11:
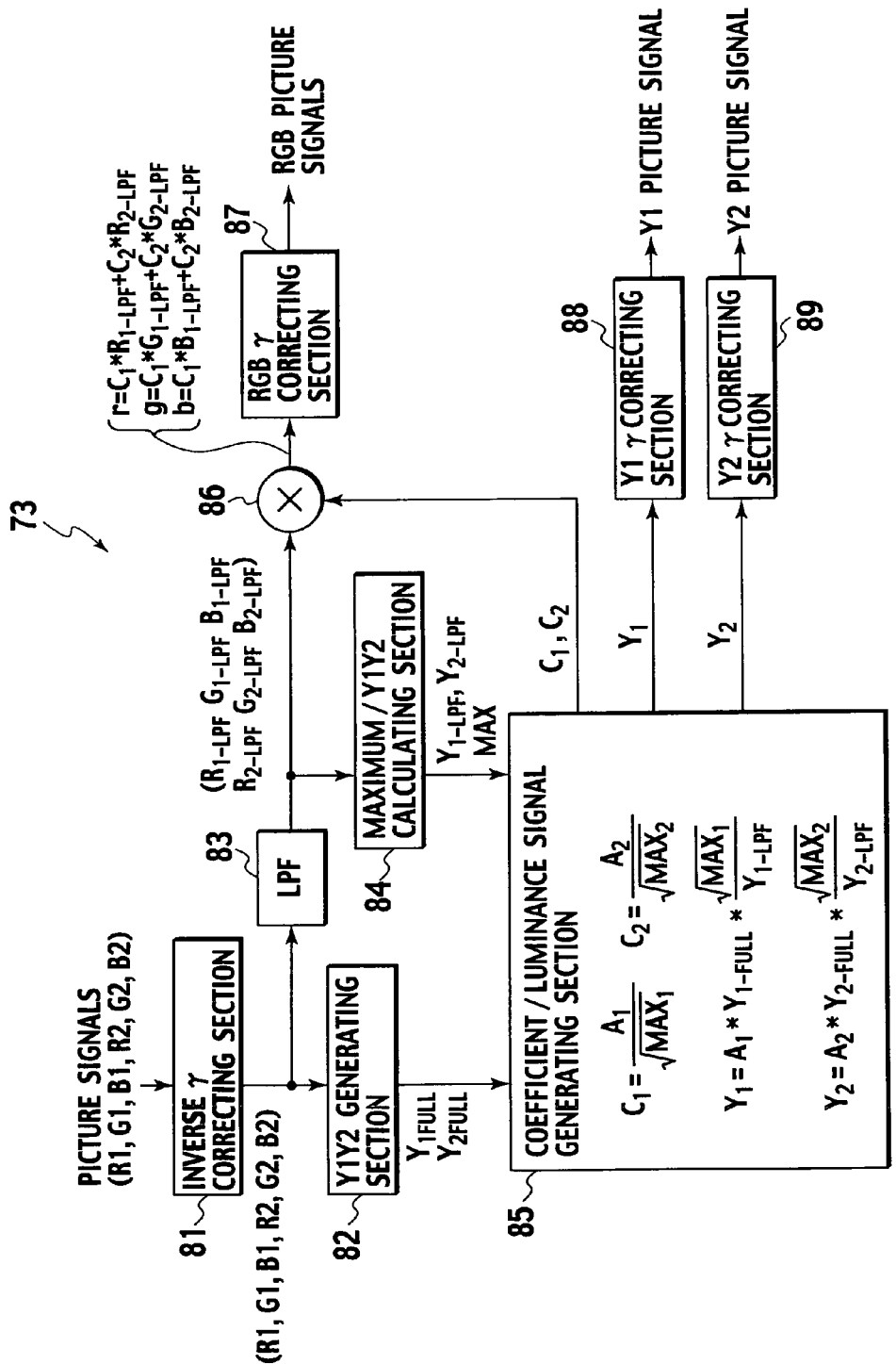
FIG. 11 is a block diagram of an embodiment of a matrix conversion decoder of FIG. 10.

FIG. 11 is a block diagram of the matrix conversion decoder 73 used in the above embodiment providing the reproducible color gamut of 6-primary colors. First of all, the matrix conversion decoder 73 inputs image signals of 6-primary colors comprising e.g. respective signals of R1 (wavelength: 615 nm), G1 (515 nm), B1 (450 nm), R2 (650 nm), G2 (550 nm) and B2 (475 nm) of FIG. 5. Then, an inverse gamma (γ) correcting section 81 once applies an inverse gamma (γ) correction to these image signals thereby to bring them back to γ1-linear signals for facilitating an internal calculation. Subsequently, with a known matrix calculation method, a Y1Y2 generating section 82 drafts a luminance signal $Y_{1FULL}$ in a frequency band (band-unlimited) by the first 3-primary color signals R1, G1 and B1 and a luminance signal $Y_{2FULL}$ in a frequency band (band-unlimited) by the second 3-primary color signals R2, G2 and B2.

In addition, in the matrix conversion decoder 73, a lowpass filter (PLF) 83 attenuates, respective high-frequency components of the 6-primary color signals from the inverse gamma (γ) correcting section 81 thereby to pick up 6-primary color signals $R_{1-LPF}$, $G_{1-LPF}$, $B_{1-LPF}$, $R_{2-LPF}$, $G_{2-LPF}$ and $B_{2-LPF}$ of low-frequency components and successively send these pickup signals to both a maximum/Y1Y2 calculating section 84 and a multiplier 86. Then, the maximum/Y1Y2 calculating section 84 calculates a maximum MAX1 of the "band-limited" first 3-primary color signals $R_{1-LPF}$, $G_{1-LPF}$ and $B_{1-LPF}$ and a maximum MAX2 of the "band-limited" second 3-primary color signals $R_{2-LPF}$, $G_{2-LPF}$ and $B_{2-LPF}$ with respect to each pixel. Further, with a known matrix calculation method, the maximum/Y1Y2 calculating section 84 calculates a low-frequency component $Y_{1-LPF}$ of the first luminance signal by the "band-limited" first 3-primary color signals $R_{1-LPF}$, $G_{1-LPF}$ and $B_{1-LPF}$ and a low-frequency component $Y_{2-LPF}$ of the second luminance signal by the "band-limited" second 3-primary color signals $R_{2-LPF}$, $G_{2-LPF}$ and $B_{2-LPF}$.

In the matrix conversion decoder 73, a coefficient/luminance signal generating section 85 inputs the luminance signals $Y_{1FULL}$ and $Y_{2FULL}$ from the Y1Y2 generating section 82, the maximums MAX1 and MAX2 from the maximum/Y1Y2 calculating section 84 and the low-frequency components $Y_{1-LPF}$ and $Y_{2-LPF}$ of the luminance signals from the same section 84. Then, the coefficient/luminance signal generating section 85 calculates coefficients $C_1$, $C_2$ and luminance signals $Y_1$, $Y_2$ by the following computing equations (wherein A1, A2 are constants for gains):

$$C_1 = A1 \cdot (MAX1)^{-1/2} \tag{1}$$

$$C_2 = A2 \cdot (MAX2)^{-1/2} \tag{2}$$

$$Y_1 = A1 \cdot Y_{1FULL} \cdot (MAX1)^{1/2}/Y_{1-LPF} \tag{3}$$

$$Y_2 = A2 \cdot Y_{2FULL} \cdot (MAX2)^{1/2}/Y_{2-LPF} \tag{4}$$

wherein $C_1$, $C_2$ are coefficients for minimizing flare components of light projected on a screen.

Using the 6-primary color signals $R_{1-LPF}$, $G_{1-LPF}$, $B_{1-LPF}$, $R_{2-LPF}$, $G_{2-LPF}$ and $B_{2-LPF}$ of low-frequency components from the LPF 83 and the coefficients $C_1$, $C_2$ from the coefficient/luminance signal generating section 85, the multiplier 86 generates the red signal "r", the green signal "g" and the blue signal "b" each more than 8 bits by the following computing equations.

$$r = C_1 \cdot R_{1-LPF} + C_2 \cdot R_{2-LPF} \tag{5}$$

$$g = C_1 \cdot G_{1-LPF} + C_2 \cdot G_{2-LPF} \tag{6}$$

$$b = C_1 \cdot B_{1-LPF} + C_2 \cdot B_{2-LPF} \tag{7}$$

These signals "r", "g" and "b" are supplied to an r/g/b gamma (γ) correcting section 87 for their gamma (γ) correction and thereafter, the so-corrected signals are supplied to the R device 27, the G device 23 and the B device 31 of FIG. 4, respectively.

Meanwhile, a Y1 gamma (γ) correcting section 88 applies a gamma (γ) correction to the luminance signal $Y_1$ from the coefficient/luminance signal generating section 85 and further supplies, for example, the Y1 device 44 of FIG. 4 with the so-corrected signal as a Y1 picture signal more than 8 bits. Simultaneously, a Y2 gamma (γ) correcting section 89 applies a gamma (γ) correction to the luminance signal $Y_2$ from the coefficient/luminance signal generating section 85 and further supplies the Y2 device 51 of FIG. 4 with the so-corrected signal as a Y2 picture signal more than 8 bits.

In this way, the matrix conversion decoder 73 supplies the luminance signals Y1, Y2 and the color signals "r", "g" and "b" to the optical system 74. Then, through the optical system 74, a multicolor image with more than 4 primary colors is projected on the screen (not shown).

The optical system 74 corresponds to one system to be selected from the embodiments described with reference to FIGS. 4 to 9 optionally. In the optical system 74, as mentioned before, the composite light, which is composed of 3-primary color (RGB) lights modulated by the first modulation optical system 101, is divided into the first light composed of three or two primary color light and the second light composed of three or two primary color lights, the second light having a different wavelength band from the first light, in the second modulation optical system 102. Next, the first light is modulated by the Y1 device 44, while the second light is modulated by the Y2 device 51 and successively, these modulated lights are combined to each other. Accordingly, with the above-mentioned constitution, it becomes possible to display a picture colored in multicolor more than 4 primary colors, allowing a single projector to accomplish an accurate color reproduction in comparison with HDTV (SMPTE 20) standard.

Comparing with a normal projector having a contrast of the ratio of few thousands: 1, the optical system of the invention is capable of realizing an image at higher contrast exceeding the ratio of million: 1 since such double-modulation by the first and second modulation optical systems allows a multiplication of their first and second contrasts (e.g. 1000×1000 in case of 1000:1 each). Furthermore owing to the displaying in multi-primary colors, the optical system of the invention can display an image in a reproducible color gamut substantially covering the color gamut that a human being is capable of detecting (e.g. CIE930 chromaticity diagram), allowing a reproduction of colors that couldn't been reproduced by conventional TVs or cinema films. In other words, the projection display device of the invention can make a significant contribution to the iconic reproduction of pictures, craft objects, designs, natures, etc. thereby to provide them with culturally-immeasurable values in spite of their aging, deterioration or disappearance in actuality.

In addition, as the optical system is equipped with a single projector (projection display device) and also adapted so as to project a composite light composed of two lights modulated by the Y1 device 44 and the Y2 device 51, the projector lens 57 has only to be provided with distortion at the conventional design level. Furthermore, there is no need of converting input signals through CGP etc. in order to align images with each other. For these reasons, it is possible to improve installation easiness of the optical system and its production cost remarkably.

Figure 12:
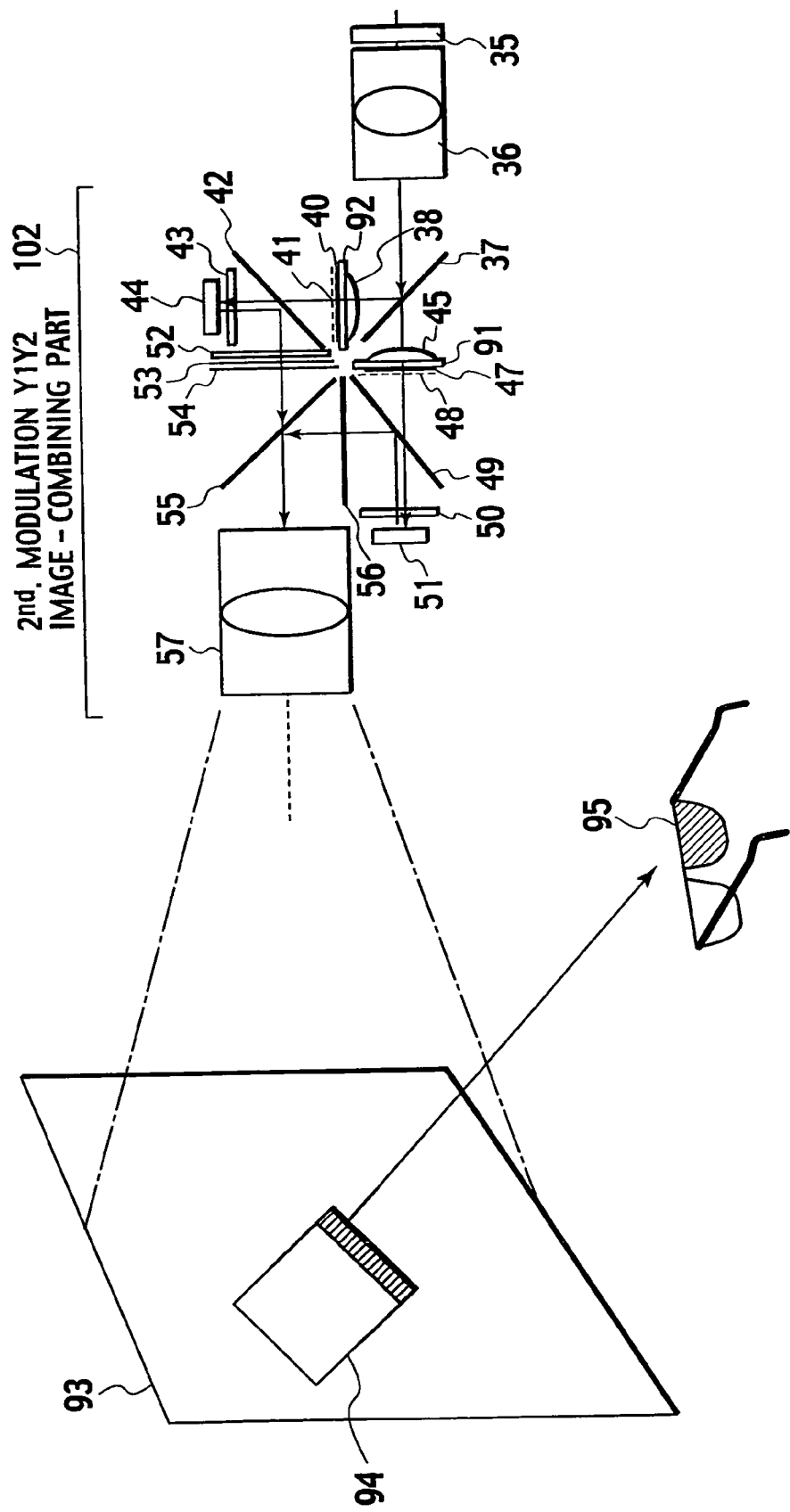
FIG. 12 is a structural view of a substantial part of an application of the optical system of the present invention.

Next, an application of the optical system of the present invention will be described below. FIG. 12 is a structural view of a substantial part of the optical system in the application of the present invention. In the application, elements identical to those of the optical system of FIG. 4 are indicated with the same reference numerals and their overlapping descriptions are eliminated. The feature of the application in FIG. 12 resides in the replacement of the wavelength spectral filters 39, 46 of FIG. 4 by wavelength spectral filter 91, 92.

The previous wavelength spectral filter 39 of FIG. 4 is adapted so as to select the red light component R1, the green light component G1 and the blue light component B1 out of the 3-primary color lights of FIG. 5, while the wavelength spectral filter 46 is adapted so as to select the red light component R2, the green light component G2 and the blue light component B2. On the contrary, according to the application, respective light components in the wavelength bands R1, G1 and B1 selected by the wavelength spectral filter 91 are identical to 3 primary color light components modulated by an image signal for human's right eye, while respective light components in the wavelength bands R2, G2 and B2 selected by the wavelength spectral filter 92 are identical to 3 primary color light components modulated by an image signal for human's left eye.

Consequently, after selecting the 3 primary color light components modulated by the image signal for right eye by means of the wavelength spectral filter 91, the same light components are further modulated by the Y1 device 44 with a luminance signal for the right-eye image signals. Meanwhile, after selecting the 3 primary color light components modulated by the image signal for left eye by means of the wavelength spectral filter 92, the same light components are further modulated by the Y2 device 51 with a luminance signal for the left-eye image signals. As a result, there is projected and displayed, on a screen 93, a stereoimage 94 where a left-eye image and right-eye image are combined with each other. Under such a situation, an audience looks at the stereoimage 94 with stereo-glasses 95 comprising a right eyeglass having the same wavelength selectivity as the wavelength spectral filter 91 and a left eyeglass having the same wavelength selectivity as the wavelength spectral filter 92, whereby the image projected on the screen 93 can be recognized as one stereoimage in the audience's head.

Thus, in a situation where the stereoscopic effect of an object is important (e.g. sculptures), the optical system of the present invention could make the object 3 dimensional with ultra-high contrast if only allowing the input signals to correspond to 3 dimensional signals. Particularly, in case of an art object of which color reproduction should be emphasized (e.g. picture, photograph), it is possible to attain faithful color-reproduction of the object by displaying it in multi-primary colors.

In addition, as the filters' recognition of an image is not influenced by polarization, the screen 93 may comprise a white screen having a gain of 1.0 and therefore, any screen could reproduce a stereoimage. Further, as the optical system of the invention is constructed so as to project an image through a single lens (not stacked projectors), the image-projection could be attained without correcting imaging signals in even a modified screen (e.g. curved screen).

According to the present invention, it is possible to attain the 6-primary color reproduction by a single projector and also possible to display a image at high contrast. Therefore, the present invention is applicable to a variety of color reproduction fields, for example, evaluations of car design, art objects, craftworks, printings, medical images, etc. Further, owing to the provision of high-resolution picture of pixels more than 4 k in the horizontal direction, national-treasure type art objects, movies, pictures, etc. can be preserved as they were discovered or manufactured, in the form of image data. Further, the present invention is also applicable to medical image displays, such as roentgen television and operating monitor.

Although the embodiment of FIG. 12 requires the stereo-glasses 95, the illustrated display device may be utilized as an optical system for 3-dimensional images. Therefore, the present invention is applicable to a variety of fields, for example, industrial design, games, simulator, etc.

Finally, it will be understood by those skilled in the art that the foregoing descriptions are nothing but some embodiments and modifications of the disclosed optical system and projection display device and therefore, various changes and modifications may be made within the scope of claims.

What is claimed is:

1. An optical system comprising:
   a modulation optical system for combining respective modulated primary color lights with each other in wavelength thereby to produce and output a first composite light, the respective modulated primary color lights being provided by modulating 3-primary color lights by 3-primary color signals produced from an image signal individually,
   a color spectroscope for transmitting and reflecting the first composite light thereby to divide it into a second composite light composed of a plurality of first primary color components each having a wavelength bandwidth narrower than that of the respective primary colors' lights, and a third composite light composed of a plurality of second primary color components each having a wavelength bandwidth narrower than that of the respective primary colors' lights and different from each of the wavelength bandwidths of the first primary color components;
   a modulator for modulating the second composite light by one of two kinds of luminance signals produced from the image signal thereby to produce a first modulation light and modulating the third composite light by the other of the luminance signals thereby to produce a second modulation light;

a photosynthesizer for combining the first modulation light with the second modulation light thereby to produce a fourth composite light; and a projector for projecting the fourth composite light.

2. The optical system of claim 1, wherein:

the color spectroscope is configured so as to divide the first composite light into the second composite light composed of three first primary color components modulated by an image signal for a human's left eye and the third composite light composed of three second primary color components modulated by an image signal for a human's right eye, and the modulator is configured so as to produce the first modulation light by modulating the second composite light by a luminance signal for an image for the human's left eye and the second modulation light by modulating the third composite light by a luminance signal for an image for the human's right eye.

3. A projection display device comprising, using a plurality of first primary color signals corresponding to a plurality of first primary color components produced by an input image signal of an image to be displayed and a plurality of second primary color signals corresponding to a plurality of second primary color components whose light wavelength bands are different from those of the first primary color components, the device comprising:

a first signal generator for generating a first band-unlimited luminance signal based on the first primary color signals and a second band-unlimited luminance signal based on the second primary color signals;

a second signal generator for band-limiting the first and second primary color signals thereby to calculate a maximum of each of the first and second band-limited primary color signals with respect to each pixel and generating third and fourth band-limited luminance signals based on each of the first and second band-limited primary color signals;

a third signal generator for generating:

first and second color-signal correction coefficients based on the maximum of the each of the first and second band-limited primary color signals with respect to each pixel, the maximum obtained by the second signal generator, a first display luminance signal based on the maximum of the each of the first and second band-limited primary color signals with respect to each pixel and the first and third luminance signals, and a second display luminance signal based on the maximum of the each of the first and second band-limited primary color signals with respect to each pixel and the second and fourth luminance signals;

a fourth signal generator for generating 3-primary color display signals, based on the first and second color-signal correction coefficients and the first and second band-limited primary color signals;

a modulation optical system that wavelength-combines respective modulation primary color signals obtained by modulating the 3-primary color display signals with respect to each primary color thereby to produce and output a first composite light;

a color spectroscope for dividing the first composite light into a second composite light composed of the first primary color components and a third composite light composed of the second primary color components thereby to emit the second and third composite lights;

a modulator for modulating the second composite light by the first display luminance signal thereby to produce a first modulation light and modulating the third composite light by the second display luminance signal to produce a second modulation light;

a photosynthesizer for combining the first modulation light with the second modulation light thereby to produce a fourth composite light; and a projector for projecting the fourth composite light.

4. The projection display device of claim 3, wherein:

the image to be displayed is a 3-dimensional image consisting of one image for a human's left eye and another image for a human's right eye, the first signal generator is configured so as to generate;

primary color signals for the image for the human's left eye, as three first primary color signals corresponding to three first primary color components;

primary color signals for the image for the human's right eye, as three second primary color signals corresponding to three second primary color components whose light wavelength bands are different from those of the first primary color components first primary color signals corresponding to three first primary color components;

a luminance signal for the human's left eye as the first band-unlimited luminance signal; and a luminance signal for the human's right eye as the second band-unlimited luminance signal, the color spectroscope is configured so as to divide the first composite light into the second composite light composed of the three first primary color components modulated by the primary color signals for the human's left eye and the third composite light composed of the three second primary color components modulated by the primary color signals for the human's right eye, and the modulator is configured so as to produce the first modulation light by modulating the second composite light by the luminance signal for the image for the human's left eye and the second modulation light by modulating the third composite light by the luminance signal for the image for the human's right eye.

* * * * *